United States Patent [19]
Rossi et al.

[11] 4,265,628
[45] May 5, 1981

[54] PROCESS FOR THE MANUFACTURE OF FIRE RESISTANT ACRYLIC POLYMER YARNS AND FILMS

[75] Inventors: Pier P. Rossi, Garlasco; Aldo Tempesti, Milan; Aldo Filippi, Bergamo, all of Italy

[73] Assignee: SNIA Viscosa Societa' Nazionale Industria, Milan, Italy

[21] Appl. No.: 61,468

[22] Filed: Jul. 27, 1979

[30] Foreign Application Priority Data

Jul. 28, 1978 [IT] Italy ............................ 26232 A/78

[51] Int. Cl.$^3$ .................. D01F 11/06; D01F 6/38; C08F 220/44
[52] U.S. Cl. .................................. 8/115.5; 525/329; 525/336; 525/351; 8/115.6; 525/354; 260/30.8 DS
[58] Field of Search ............... 8/115.5, 115.6; 526/481, 23, 38, 41; 525/336, 351, 354

[56] References Cited

U.S. PATENT DOCUMENTS

| | | | |
|---|---|---|---|
| 2,563,640 | 8/1951 | Brown | 525/336 |
| 2,563,662 | 8/1951 | Rothrock | 525/336 |
| 3,736,309 | 5/1973 | Gump et al. | 525/336 |
| 3,736,310 | 5/1973 | Gump et al. | 526/341 |
| 3,820,951 | 6/1974 | Di Edwards | 8/115.5 |
| 3,954,947 | 5/1976 | Didchenko et al. | 8/115.5 |
| 3,998,797 | 12/1976 | Branli et al. | 525/336 |
| 4,001,382 | 1/1977 | Matsumura et al. | 8/115.5 |
| 4,031,188 | 6/1977 | Kohler | 8/115.5 |

OTHER PUBLICATIONS

55892Y/32 Derwent Abs. (DT2603–029), "Cyclizing of Pan Fibers by Alkaline Treatment", Aug. 4, 1977, FARH (Hoechst).

*Primary Examiner*—Joseph L. Schofer
*Assistant Examiner*—Herbert J. Lilling
*Attorney, Agent, or Firm*—Karl F. Ross

[57] ABSTRACT

A process for the preparation of fire retardant formed bodies such as yarns and films of acrylic polymers is disclosed. The process comprises subjecting the polymer to sulphuration and subjecting the sulphurated polymer to a basic treatment by means of an alkali metal hydroxide, such as sodium hydroxide, whereby the polymer molecule acquires a cyclic structure.

6 Claims, No Drawings

PROCESS FOR THE MANUFACTURE OF FIRE RESISTANT ACRYLIC POLYMER YARNS AND FILMS

FIELD OF THE INVENTION

The present invention relates to a process for manufacturing fire-resistant acrylic polymer formed bodies such as yarns and fibers.

BACKGROUND OF THE INVENTION

As is known, the problem of conferring high fire resistance to polymers, in particular to polymeric filaments, fibers or films, is of great present importance, in particular in the textile arts, and the requirements of low inflammability and self-extinguishing properties—which together may be referred to as "fire resistance" characteristics—have become increasingly severe, also in view of legislative developments in various countries. The methods widely adopted involve the introduction into the polymer of fire resistance agents or the introduction into the molecule of the polymers of fire-resistant groups. Said agents and groups often contain a halogen as the basic element. Such methods however have numerous drawbacks, and in particular not only do they involve modifications of the manufacturing processes and a substantially higher cost of the finished products, but they also confer to the polymer the harmful property of evolving poisonous or at least dangerous fumes to the extent that there is a tendency in the legislation of many countries drastically to limit the amount of halogens which may be present in any closed room.

OBJECT OF THE INVENTION

The present invention has as its object the provision of acrylic polymer formed bodies such as yarns and films, with improved fire resistance and which are free of all the aforesaid drawbacks based on a modification of the molecular structure of the polymer and which may be carried out without significant modification of the manufacturing processes and machinery currently employed for the production of acrylic fibers and films.

DESCRIPTION OF THE INVENTION

For a better understanding of the invention, it is well initially to set forth some considerations of a chemical character.

The process according to the invention involves as a first step the substitution of CN groups with thiamido groups in the polymeric chain. Such substitution is carried out through a sulphuration treatment, specifically by treating the polymer with a sulphide, e.g. in aqueous solution, as better explained hereinafter. The reaction occurs according to the following scheme:

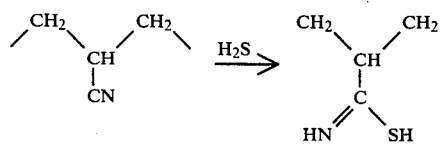

The thiamido-containing polymer already has greater fire resistance than the untreated acrylic polymer. Said polymer however has the property of acquiring a cyclic structure as a result of a treatment with alkaline agents. Generally indicating by $-B^{\ominus}$ an ion of the alkaline agent, a possible mechanism involves substitution with said ion $-B^{\ominus}$ of the ion $-HS^{\ominus}$ in the molecule of the substituted polymer, according to the following scheme:

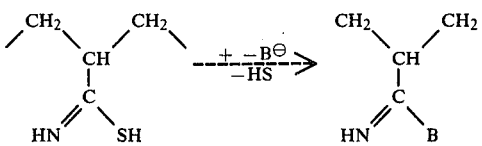

In other cases the sulphur may be retained entirely or in part. In any case a cyclic molecule is formed which, in its essential and main part, comprises the repeated unit hereinafter shown within the broken line rectangle:

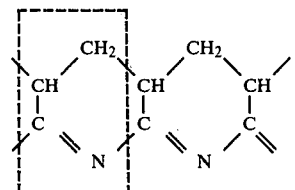

The polymer thus further substituted may, under conditions which will be described, acquire a cyclic structure according to the following scheme:

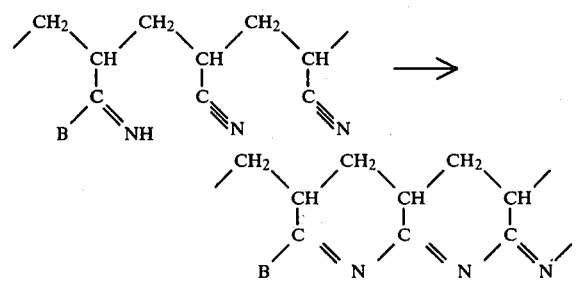

The cyclic polymer possesses a high degree of fire resistance. As is known, the fire resistance is evaluated on the basis of the index OI (Oxygen Index-ASTM D-3863-70) and an OI value equal to or higher than 26 indicates a fire resistance product which meets the specifications generally accepted for such products. The aforesaid cyclic polymers may reach OI values of 28-30 and more. They have the drawback of a yellow-reddish color, but this does not prevent their use in a broad range of products.

SUMMARY OF THE INVENTION

The process according to the invention, in particular, comprises the steps of preparing a spinning solution (dope) of an acrylic polymer, subjecting the polymer solution to a sulphuration treatment, spinning the said solution whereby to form formed bodies of the sulphurated polymer and subjecting said bodies to an alkaline treatment by means of an alkali metal hydroxide.

The aforementioned sulphuration however could be carried out on the solid polymer as well as on the solution of the polymer, and therefore both in heterogeneous and in homogeneous phase.

Operating in heterogeneous phase, the polymer, optionally in the form of film or yarns, is sulphurated by reacting it with an aqueous solution of monoethanolaminesulphide. In place of monoethanolamine, triethanolamine sulphide and in general other amine sulphides may be used.

DESCRIPTION OF THE PREFERRED EMBODIMENTS

The preferred reaction conditions are: concentration of the amine sulphide solution from 5% to 20% e.g. 10%; treatment temperature from 30° C. to 100° C., e.g. about 82° C. The sulphur content obtained depends on the duration of the treatment, which however preferably does not exceed 2 hours and 30 minutes in order not to lead to polymer degradation. The sulphur contents vary from 3 and 15% and preferably from 5 to 7% by weight.

Operating in homogeneous phase, the hydrogen sulphide may be caused to be absorbed by a solution of the polymer in organic solvent. The preferred sulphur content of the polymer ranges from 7 and 10% by weight, corresponding to a substitution of 14-20% of the —CN groups. The preferred temperature for this treatment varies from 30° to 50° C., preferably about 40° C.

It is to be noted that as a rule the invention is applicable to all acrylic type polymers, and therefore both to polyacrylonitrile and to the so-called modacrylic polymers, viz polymers of acrylonitrile containing from 35 to 85% by weight of acrylonitrile units in the molecule, the remainder being constituted by units deriving from various comonomers, such as e.g. vinyl esters, vinylidene chloride, unsaturated sulphonated monomers, and so forth—the whole as well known in the art. The acrylic and modacrylic polymers are soluble in various solvents but the preferred solvents for carrying out this invention and the most commonly used in the art are organic solvents such as dimethylformamide (DMF), dimethylacetamide and dimethylsulphoxide (DMSO). The sulphuration reaction in homogeneous phase may be effected in anyone of these solvents, in particular in DMF. Therefore it may be carried out on the end of polymerization solutions or on the spinning solutions. The treatment tends to lower the viscosity of the solution, the starting polymer concentration being equal, but not to such an extent as to prevent spinning by known processes.

The basic treatment, to be effected on the already sulphurated polymer, chemically consists in a nucleophilic attack by means of an alkali metal hydroxide with the progressive elimination, to a greater or lesser extent, of the hydrogen sulphide, which is followed by the catalysis of the polymerization reaction of the groups —CN on the part of the new group which has entered into the molecule, whereby the molecule becomes cyclic. Generally as the reaction progresses and the free —CN groups gradually disappear, which can be evidenced e.g. by a spectroscopic analysis, accompanied by the appearance of —CN groups which are conjugated because of the cyclization reaction, the OI value of the polymer, viz. its fire resistance properties, increases, up to a maximum beyond which said value begins to decrease because of a degradation of the polymer due to hydrolysis.

The preferred nucleophilic agents are sodium hydrate and potassium hydrate. Sodium hydrate, which is preferred, is used in aqueous solution in concentrations ranging between 0.2 and 10% and preferably between 1 and 4% by weight and with treatment temperatures between 30° and 100° C. and preferably between 60° and 80° C., and for time periods between 5 and 360 seconds, preferably between 10 and 180 seconds. OI value ranging between 27 and 30 are attained at temperatures between 60°· and 80° and with concentrations between 1 and 4% within time periods which may vary between 30 and 120 seconds.

Potassium hydrate requires longer reaction times.

By using sodium hydrate under the aforesaid conditions, therefore, the alkaline treatment can be carried out not only continuously, but also as a part of the industrial yarn spinning process, without substantial modification of said process and of the machinery used to carry it out, as already known and practised in the art.

According to the teaching of the art, alkali metal hydrates have the drawback of causing a degradation of the acrylic polymers, and their use therefore would be expected to lead to yarns having unacceptably low mechanical characteristics. The processing conditions above set forth critically provide yarns having high OI and good mechanical characteristics while being fully compatible with standard spinning operations and machinery. This is a highly useful and surprising result.

A preferred form of the invention involves the performance of the sulphuration and basic treatments in the following way: a spinning solution of the original polymer is prepared, the sulphuration treatment is carried out on the solution at room pressure or at pressure which is higher than room pressure by 1 Ate to 5 Ate. Said solution is successively degassed, spun, coagulated, drawn and washed, and the basic treatment is carried out at a suitable moment after coagulation, e.g. by substituting a washing bath with an aqueous solution of sodium hydrate at concentrations from 1 to 4%, e.g. about 3%, suitably choosing the mechanical conditions of the treatment in such a way that the yarn will remain in the alkaline bath for a period of time sufficient to affect the complete basic treatment, viz. within the limits hereinbefore specified.

Alternatively the polymer which has been sulphurated but not subjected to the basic treatment, may be spun in a normal coagulating bath, and the basic treatment may be carried out on the yarn.

When it is desired to spin the product which has been sulphurated and subsequently subjected to basic treatment, then it is convenient to use a coagulating bath having 50% DMF and water and a temperature comprised between 5° and 10° C., e.g. about 7° C., and subsequently the yarn is passed through a certain number, e.g. 5, of washing and drawing tubs, at gradually increasing speeds to obtain the desired draw ratio which may vary altogether between 4 and 8 and at increasing temperatures, e.g. from a temperature of the first bath between 20° and 30° to a temperature of the last bath between 80° and 100°; the first bath may have, though it need not necessarily have, a dimethylformamide content of about 20% and the remaining baths are constituted by water. When the basic treatment is carried out as a part of the spinning process, one of the washing and drawing baths is substituted with an alkaline bath having suitable temperature composition and length.

The yarns obtained without the alkaline treatment, as has been said, have an OI value which is increased with respect to the untreated yarn, but is generally lower than the acceptable minimum of 26. The mechanical characteristics are substantially the same as those of the untreated yarn.

The yarns obtained by carrying out the alkaline treatment during the spinning have characteristics which vary according to the duration of the alkaline treatment and reach OI values between 26 and over 30. The tenacities may be slightly less than those of the normal yarns but the loop tenacities are higher. All in all, the treated yarn may be considered of equal quality as a normal yarn from the mechanical viewpoint.

The invention will now be better understood from the description of a number of preferred illustrative and non-limitative embodiments.

The treatments are carried out by means of the apparatus and under the mechanical conditions normally employed for the production of acrylic and modacrylic yarns by wet spinning, the only variations concerning the treatment variables connected to the sulphuration treatment and to the basic treatment. Therefore the spinning dope is spun in a coagulating bath and thereafter passes through a series of troughs, e.g. in the number of 5, wherein it undergoes predrawing, drawing, washing and finishing treatments and of course the basic treatment when it is carried out. The yarn is taken up from the last of the said troughs, it is wound, dried, wound up on bobbins and in substance subjected to the usual mechanical and technical treatments. Percentages are by weight.

EXAMPLE 1

The starting polymer is a copolymer composed of about 90% acrylonitrile, 9% methylacrylate and about 1% sodium allylsulphonate.

The polymer is prepared by polymerization in the spinning solvent which is DMF, in a way known per se, whereby a spinning dope is obtained which has a polymer concentration of 21%. Said solution is subjected to the sulphuration treatment by causing hydrogen sulphide to be absorbed thereby. The treatment temperature is 40°. The absorption is carried out at a pressure slightly higher than atmospheric (about 50 cm of water) and the viscous solution is strongly stirred. The treatment lasts 4 hours, whereafter the sulphur content of the polymer is 7.0% by weight. The sulphuration treatment is carried out in a glass vessel provided with a lid, gas inlet tube, stirrer, thermometer, gasometer for dosing the gas introduced, and temperature control system.

The solution of sulphurated polymer is degassed from the excess $H_2S$ by bubbling nitrogen therethrough and subsequently under a vacuum and is now ready for spinning. The viscous solution is spun in the usual way in a spinning tub containing a coagulating bath constituted by 50% by weight of DMF and 50% by weight of water at a temperature of 7° C. From said tub the filaments pass into a pre-drawing tub wherein a pre-drawing occurs to a ratio of 2.2, the liquid therein contained being a mixture of DMF and water, the DMF percentage being only 20%, the temperature being 25° C.

The pre-drawn filaments pass thereafter into a washing tub in a water bath. In this tub practically no drawing occurs. The temperature is about 32°.

The filaments pass then into the tub wherein the basic treatment occurs, which contains a 3% sodium hydrate aqueous solution, maintained at a temperature of 60° C., the dimensions of the tub being such (in relation to the speed of travel of the filaments in said tub) that the filaments remain in the tub, and therefore the treatment lasts about 40 seconds.

The filaments which have undergone the alkaline treatment pass then to a washing tub at 60° C. and subsequently to a drawing tub, wherein they are drawn to 7.4 ratio, and wherein they are also washed, the bath being essentially constituted by water kept at a temperature of 90°–95° C.

Finally the filaments pass to a finishing step wherein no more drawing occurs. The particular conditions which are maintained in the various tubs, and thus their number, the partition of the draw ratio among the several tubs, the feed and take-up or yarn travel speeds, and all the other treatment variables, are variable and may be easily defined by persons skilled in the art. By way of example, the take-up speeds of the various tubs might be as follows: from the coagulation tub, 7.5 mt/min; from the pre-drawing tub, 16.0 mt/min; from the first wash tub 16.0 mt/min; from the basic treatment tub, 26 mt/min; from the wash tub after the basic treatment, 26 mt/min; from the final drawing tub, 54.4 mt/min.

The thus obtained yarn has the following characteristics: Count 2.13 gr/den; tenacity 2.35 g/den; break elongation 44.4%; loop tenacity 1.2 g/den; OI index 29.2.

If the duration of the basic treatment is raised to 1 minute, the OI index rises to 30.3, but the mechanical characteristics are slightly lowered, viz. the tenacity decreases to 2.1 g/den, the break elongation to 32% and the loop tenacity to 1.1 g/den.

EXAMPLE 2

The operations of Example 1 are carried out but the basic treatment is omitted, viz. it is substituted with a treatment in water at 60° C.

The characteristics of the yarn obtained are: Count 2.1/den; tenacity 2.92 g/den; break elongation 31.7%; loop tenacity 1.4 g/den; OI index 23.8. It is seen that the mechanical characteristics are very good but the OI index, although it is higher than that of an untreated yarn (in general OI: 18.2) does not reach the value of 26 considered as the minimum which permits a yarn to be qualified as fire resistant.

The yarns in question has a sulphur content of 7.42%. The sulphur content may also be slightly less or substantially higher, e.g. up to 10%, and some improvement in the OI index may be achieved, e.g. up to 22.0.

EXAMPLE 3

In the following table the sulphur content and the OI for a polymer which has only been sulphurated, viz. has not undergone a basic treatment, are tabulated.

| S | OI |
|---|---|
| 0 | 18.2 |
| 2.4% | 19 |
| 5.9% | 19.8 |
| 6.8% | 20.2 |
| 7.9% | 21.5 |
| 8.8% | 22.0 |
| 10.0% | 22.0 |

EXAMPLE 4

In the following table the OI values are correlated with the durations of a treatment with a 7% by weight monoethanolamine aqueous solution and at 80°. The sample was in the form of a film with a sulphur content of 8.85%.

| Duration of treatment | OI |
|---|---|
| 5 min | 22.2 |
| 10 min | 23.3 |
| 15 min | 23.8 |
| 20 min | 24.8 |
| 25 min | 24.5 |

EXAMPLE 5

The following two tables relate to the treatment of sulphurated polymers in the form of films with sodium hydroxide.

A-

Initial sulphur content: 10%

1% by weight sodium hydroxide solution at 80°

| Duration of treatment | OI |
|---|---|
| 0 | 22.0 |
| 30 sec. | 25.6 |
| 1 min | 25.9 |
| 1 min 30 sec. | 29.2 |
| 2 min | 29.8 |
| 2 min 30 sec. | 29.5 |

B-

Initial sulphur content: 8.12%

4% by weight sodium hydroxide solution at 60°

| Duration of treatment | OI |
|---|---|
| 0 | 21.6 |
| 20 sec | 27 |
| 30 sec | 27.6 |
| 40 sec | 28.6 |
| 50 sec | 30.3 |

We claim:

1. A process for the preparation of fire resistant formed bodies, such as yarns and filaments, of acrylonitrile polymers containing from 35 to 85% by weight of acrylonitrile units in the molecule, comprising the steps of:

(a) subjecting the acrylonitrile polymers to a sulfuration treatment in a heterogeneous phase by treatment with a 10 to 20% aqueous solution of an amine sulfide at a temperature of about 80° C. for a period of about 25 minutes to form a polymer of the formula:

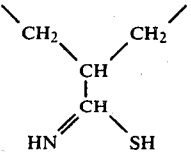

(b) treating the sulfurated polymer formed during step (a) with an alkali metal hydroxide, at a temperature between 30° C. and 100° C.; and
    (c) removing the alkali metal hydroxide from the sulfurated polymer before drying said polymer.

2. The process defined in claim 1, wherein the sulfurated polymer is treated with the alkali metal hydroxide after having been spun to form filaments and before the filaments are completely drawn.

3. A process for the preparation of fire resistant formed bodies such as yarns and filaments, of acrylonitrile polymers containing from 35 to 85% by weight of acrylonitrile units in the molecule, comprising the steps of:

(a) preparing a solution of the acrylonitrile polymers in an organic solvent;
    (b) sulfurating the acrylonitrile polymer in said solution in a homogeneous phase to form a polymer of the formula:

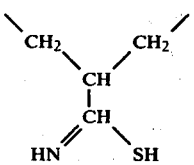

(c) spinning said solution to produce formed bodies;
    (d) treating said formed bodies in an aqueous solution with an alkali metal hydroxide at a temperature between 30° C. and 100° C.; and
    (e) removing the alkali metal hydroxide from the formed bodies before drying the same.

4. The process defined in claim 3, step (b), wherein hydrogen sulfide is employed to sulfurate the acrylonitrile polymer.

5. The process defined in claim 3, step (b), wherein hydrogen sulfide is employed to sulfurate the acrylonitrile polymer at a temperature between 30° and 50° C.

6. The process defined in claim 3, step (b), wherein sulfuration with hydrogen sulfide is continued until a sulfur content of the acrylonitrile polymer of between 7 and 10% is reached.

* * * * *

UNITED STATES PATENT AND TRADEMARK OFFICE
CERTIFICATE OF CORRECTION

PATENT NO. : 4 265 628
DATED : 5 May 1981
INVENTOR(S) : Pier P. Rossi et al

It is certified that error appears in the above-identified patent and that said Letters Patent are hereby corrected as shown below:

In the heading, left column, item [73], please correct the assignee's name to read:

-- SNIA VISCOSA SOCIETA' NAZIONALE INDUSTRIA

APPLICAZIONI VISCOSA S.p.A. --.

Signed and Sealed this

First Day of December 1981

[SEAL]

Attest:

GERALD J. MOSSINGHOFF

*Attesting Officer*     *Commissioner of Patents and Trademarks*